UNITED STATES PATENT OFFICE.

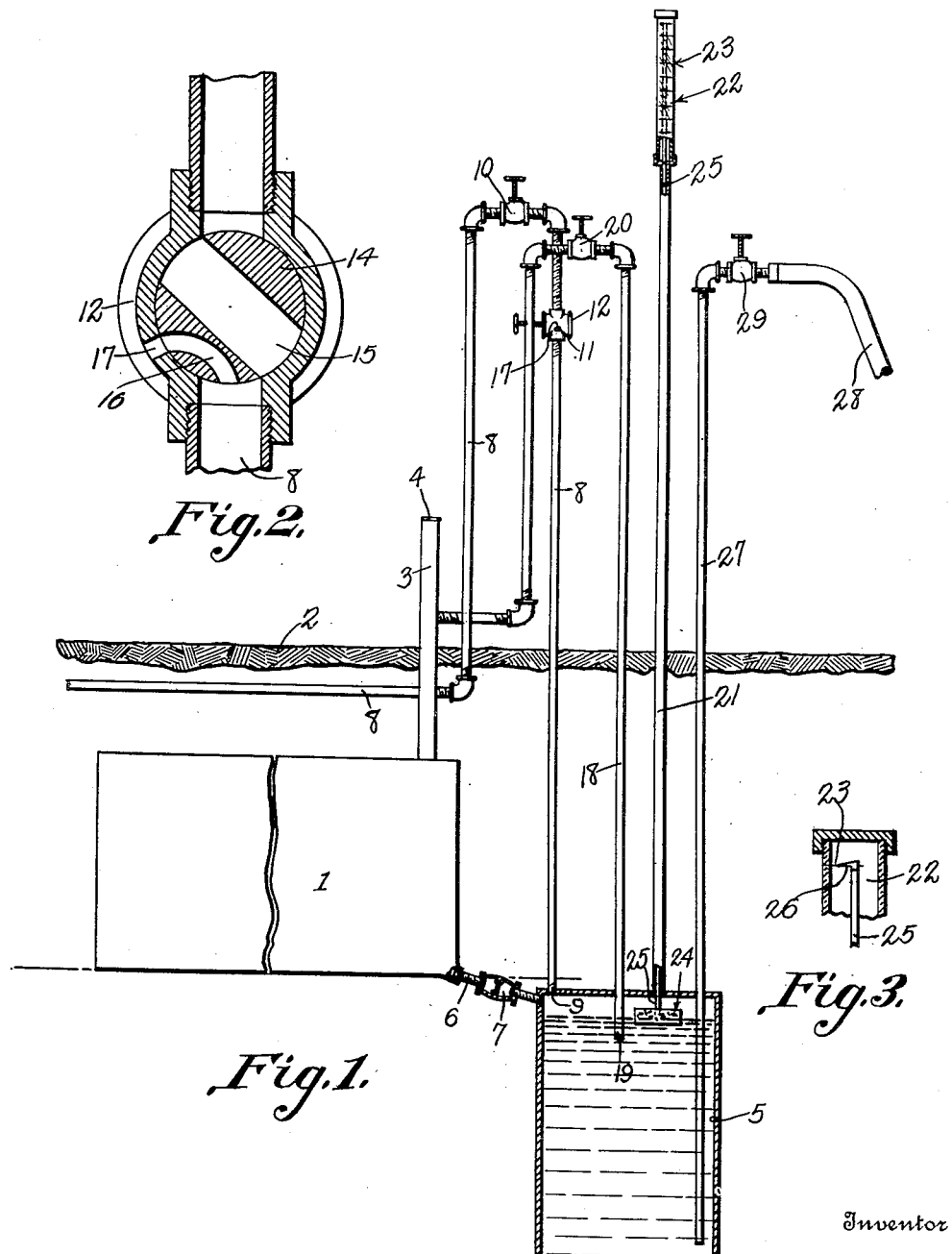

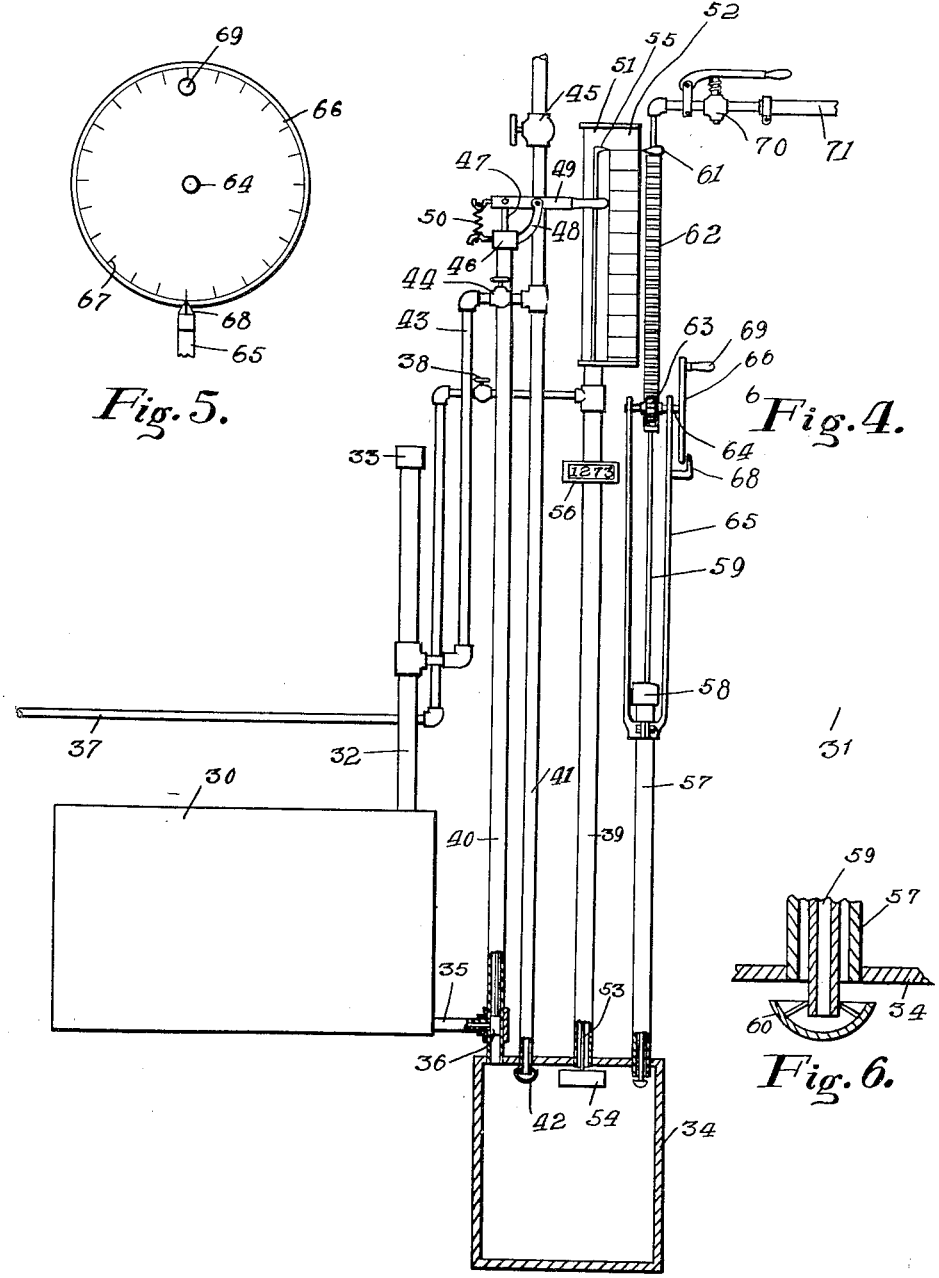

WILEY H. PRIDGEN, OF CREEK, NORTH CAROLINA.

COMPRESSED-AIR DEVICE FOR HANDLING GASOLENE.

1,350,517.     Specification of Letters Patent.    Patented Aug. 24, 1920.

Application filed November 21, 1919. Serial No. 339,721.

*To all whom it may concern:*

Be it known that I, WILEY H. PRIDGEN, a citizen of the United States, residing at Creek, in the county of Warren and State of North Carolina, have invented a new and useful Compressed-Air Device for Handling Gasolene, of which the following is a specification.

It is the object of this invention to provide novel means whereby a measured quantity of liquid may be delivered to a consumer, and, further, the invention aims to improve and simplify, generally, devices of that kind to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1 shows in side elevation, a device constructed in accordance with the invention;

Fig. 2 is a section taken through the combined cutoff and vent valve;

Fig. 3 is a fragmental section showing part of the indicating mechanism;

Fig. 4 is a diagrammatic side elevation showing a modified form of the invention;

Fig. 5 is an elevation showing the dial; and

Fig. 6 is a sectional detail showing the lower end of the delivery pipe and adjacent parts.

The numeral 1 denotes a storage tank, which if desired may be located below the surface of the ground indicated at 2. The liquid to be dispensed is delivered into the tank 1 through a filling pipe 3 generally provided with a movable lid 4. A measuring vessel 5 is located below the surface of the ground and is so disposed with respect to the storage tank 1 that the contents of the tank may flow into the measuring vessel by gravity. A pipe 6 connects the tank 1 with the vessel 5. A check valve 7 is interposed in the pipe 6 and opens toward the vessel 5.

The numeral 8 denotes a pipe through which air under pressure may be supplied to the vessel 5, one end 9 of the pipe communicating with the top of the vessel. A cut-off valve 10 is interposed in the pipe 8. A combined vent and cut-off valve 11 is interposed in the pipe 8 between the valve 10 and the vessel 5.

The valve 11 may be variously constructed. It may include a casing 14 wherein a valve proper, denoted by the numeral 14, is journaled. The valve 14 has a passage 15 adapted to establish communication through the pipe 8. The valve 14 may be provided, further, with a passage 16 adapted to communicate with the air pipe 8 and with a port 17 formed in the casing 12. A pipe 18 leads from the vessel 5 to the filling pipe 3, the lower end of the pipe 18 projecting into the vessel as shown at 19. A cut off valve 20 is interposed in the pipe 18.

A tube 21 extends upwardly from the vessel 5 and carries a transparent head 22 having graduations 23. A float 24 is located in the vessel 5 and carries a rod 25 received slidably in the tube 21. On the upper end of the rod 25 there is an indicator 26 coöperating with the graduations 23 on the transparent head 22.

An outlet pipe 27 leads from the vessel 5, the lower end of the pipe 27 being extended downwardly to a point adjacent to the bottom of the vessel. A delivery hose 28 may be connected with the upper end of the pipe 27, the said pipe carrying a cut off valve 29 of any desired sort.

The graduations 23 indicate the capacity of the vessel 5 measured between the lower end of the pipe 18 and the lower end of the pipe 27. The pipe 3 and the pipe 18 may be alluded to as a return conduit extending from the vessel 5 to the tank 1.

In practical operation, the valves 29 and 20 are closed, and the valve 10 is closed so that there is no air under pressure delivered to the vessel 5. The valve 14 is turned so that the passage 15 is out of registration with the pipe 8, the passage 16 in the valve 14 registering with the port 17. Air can now flow from the vessel 5 to the atmosphere by way of the lower part of the pipe 8, the passage 16 and the port 17. Since the pressure in the vessel 5 is reduced to atmospheric pressure, the valve 7 will open, and gasolene or other liquid in the tank 1 will flow by gravity to the vessel 5 through the pipe 6, until the vessel 5 is completely filled. The valve 14 is operated so that the passage 15 establishes communication between the upper and lower parts of the pipe 8, the passage 16 no longer being in registration with the port 17. The valve 20 is opened and then communication is established by way of pipes 18 and 3, between the vessel 5 and the tank 1. The valve 10 is opened admitting air into the vessel 5 by the way of the pipe 8. The surplus liquid in the vessel 5 flows into the tank 1 through the pipes 18 and 3 until the level in the vessel 5 is at the lower end 19 of the pipe 8. Then there is a measured quantity of liquid in the vessel 5, between the lower end of the pipe 27 and the lower end 19 of the pipe 8. The valve 20 is closed. The air under pressure in the vessel 5 forces the contents of the vessel 5 out through the pipe 27 and the hose 28, the valve 7 being held closed by the air pressure in the vessel 5. The amount of liquid delivered through the pipe 27 and the hose 28 may be regulated by manipulating the valve 20. The quantity of liquid discharged may be ascertained by noting the position of the indicator 26 on the graduations 23, the indicator and the rod 25 rising or falling with the changes of level in the vessel 5 since the rod 25 is connected with the float 24.

As shown in Fig. 4, the device includes a storage tank 30 which may be located below the surface 31 of the ground. The liquid to be dispensed is introduced into the storage tank 30 by way of a filling pipe 32 which may have a removable lid 33. A measuring vessel 34 is disposed below the surface 31 of the ground and is so located with respect to the storage tank 30 that liquid may flow by gravity from the storage tank to the measuring vessel through a pipe 35, and through the lower end of a pipe 40, the pipe 40 communicating with the top of the measuring vessel. A valve 36 operates in the pipe 40 at the point of juncture between the pipes 35 and 40 and controls the flow from the tank 30 to the measuring vessel 34. An air pipe 37 is provided, the same carrying a hand valve 38. The air pipe 37 communicates with a larger pipe 39, it being obvious that air under pressure may be transmitted to the vessel 34 through the pipes 37 and 39. A pipe 41 enters the top of the measuring vessel 34 and extends downwardly a short distance into the measuring vessel. The upper end of the pipe 41 communicates with the atmosphere, the lower end of the said pipe carrying a bowl 42, adapted to hold a liquid seal. A branch 43 leads from the pipe 41 to the filling pipe 32 and carries a hand valve 44. There is a hand valve 45 in the pipe 41, above the point of juncture between the pipes 43 and 41.

A gland 46 is mounted on the upper end of the pipe 40 and in the gland, a rod 47 reciprocates, the rod being connected to the valve 36. A bracket 48 is mounted on the gland 46 and on the bracket, a lever 49 is fulcrumed intermediate its ends. A spring 50 forms a connection between one end of the lever 49 and the gland 46. The function of the spring 50 is to hold the lever 49 in such a position that the valve 36 will be closed with respect to the pipe 35.

On the upper end of the pipe 39 a transparent head 51 is mounted, a scale 52 being located adjacent to the head. A rod 53 is mounted to reciprocate in the pipe 39 and is provided at its lower end with a float 54, responsive to changes of level in the vessel 34. The upper end of the rod 53 carries an indicator 55 operating with the scale 52 and located within the transparent head 51. A registering device 56 is mounted on the pipe 59 and is under the control of the rod 53. The registering device 56 serves to indicate the total amount of liquid dispensed. The registering device may be of any desired form and the connection between the registering device and the rod 53 may be constructed as desired.

A tube 57 is mounted in the top of the measuring vessel 34. There is a gland 58 on the upper end of the tube 57. A delivery pipe 59 is mounted for reciprocation in the gland 58 and extends downwardly through the tube 57 into the measuring vessel 34, the lower end of the delivery pipe carrying a sealing bowl 60. An indicator 61 is mounted on the reciprocating delivery pipe 59 and coöperates with the scale 52. The delivery pipe 59 is provided with a rack 62 coöperating with a pinion 63 on a shaft 64 journaled in a frame 65 mounted on the tube 57. A disk 66 is secured to the shaft 64 and is marked at 67, in any suitable way, to indicate the number of gallons which the purchaser desires. The frame 65 carries an index 68 coacting with the marks 67 on the disk 66. The shaft 64 is rotated by means of a handle 69 on the disk 66. A spring-closed valve 70 is interposed in the upper end of the delivery pipe 69. A hose 71 may be connected with the extremity of the delivery pipe 69.

In practical operation, the valves 70, 38 and 44 are closed, and the valve 45 is open, the valve 36 is raised to an open position through the instrumentality of the rod 47 and the lever 49. Then liquid flows from the tank 30 into the vessel 34 until the vessel is filled, air escaping by way of the pipe 41 to the atmosphere.

After the vessel 34 has been filled, the valve 45 is closed, the valve 44 is opened and the valve 38 is opened. Then air under pressure is transmitted to the vessel 34 by way of the pipe 37 and the pipe 39. The liquid in the vessel 34 is forced out of the vessel by way of the pipes 39 and 37, the valve 38 being open, until the level determined by the lower end of the pipe 41 is reached, the excess liquid being returned from the vessel 34 to the tank 30 by way of the pipes 41, 43 and 32. There is now a measured quantity of liquid between the lower end of the pipe 41 and the bottom of the vessel 34.

The disk 66 is rotated by the handle 69 until the index 68, coöperating with the marks 67 on the dial 66 indicates the quantity of gasolene or other liquid desired by the purchaser. When the disk 66 is rotated, the shaft 64 and the pinion 63 are rotated, the rack 62 causing the delivery pipe to slide downwardly in the tube 57, the lower extremity of the pipe 59 being moved downwardly in the vessel 34, and the indicator 61 being carried downwardly to a predetermined point on the scale 52. Since there is an air pressure on the contents of the vessel 34, delivered through the pipes 37 and 39, liquid will flow through the pipe 59 until the level in the vessel 34 is lowered to a point represented by the lower end of the pipe 59. As soon as air begins to flow through the hose 71, the valve 70 is permitted to close. Thus, a measured quantity of liquid is dispensed to the purchaser.

It has been pointed out hereinbefore that when the pipe 59 is lowered, the indicator 61 is lowered to a predetermined point on the scale 52. As the level of the liquid in the vessel 34 falls, the float 54 moves downwardly, carrying with it the rod 53 and the indicator 55. An operator or the purchaser can follow the movement of the indicator 55, and as soon as that indicator stands opposite to the indicator 61 both parties to the transaction will be advised that the predetermined quantity of liquid has been delivered through the hose 71.

Having thus described the invention, what is claimed is:—

1. In a device of the class described, a measuring vessel; a storage tank discharging by gravity into the vessel; a valve controlling the passage of liquid from the tank to the vessel; a liquid discharge pipe extending into the vessel; means for supplying air under pressure to the vessel; a valve controlling said means; a valve controlling the egress of air from the vessel; and valve-controlled means for returning surplus liquid from the vessel to the tank.

2. A device of the class described, constructed as set forth in claim 1, and further characterized by the provision of a float-actuated indicator responsive to changes of level in the vessel.

3. A device of the class described, constructed as set forth in claim 1 and further characterized by the fact that the liquid discharge pipe is slidably mounted, in combination with means under the control of an operator for raising and lowering the discharge pipe to regulate the position of the lower end thereof in the measuring vessel.

In testimony that I claim the foregoing as my own, I have hereto affixed my signature in the presence of two witnesses.

WILEY H. PRIDGEN.

Witnesses:
 E. R. Wood,
 Burten Williams.